(12) United States Patent
Matsushita et al.

(10) Patent No.: US 11,081,286 B2
(45) Date of Patent: Aug. 3, 2021

(54) METHOD FOR MANUFACTURING ELECTROLYTIC CAPACITOR, AND ELECTROLYTIC CAPACITOR

(71) Applicant: Panasonic Intellectual Property Management Co., Ltd., Osaka (JP)

(72) Inventors: Shumpei Matsushita, Yamaguchi (JP); Tomoyuki Tashiro, Yamaguchi (JP); Takayuki Matsumoto, Saga (JP); Tatsuji Aoyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 85 days.

(21) Appl. No.: 16/562,033

(22) Filed: Sep. 5, 2019

(65) Prior Publication Data

US 2020/0105479 A1 Apr. 2, 2020

(30) Foreign Application Priority Data

Sep. 28, 2018 (JP) .............................. JP2018-186031

(51) Int. Cl.
*H01G 9/02* (2006.01)
*H01G 9/028* (2006.01)
(Continued)

(52) U.S. Cl.
CPC .............. *H01G 9/02* (2013.01); *H01G 9/0032* (2013.01); *H01G 9/0036* (2013.01);
(Continued)

(58) Field of Classification Search
CPC .. H01G 9/0029; H01G 9/0032; H01G 9/0036; H01G 9/02; H01G 9/151;
(Continued)

(56) References Cited

U.S. PATENT DOCUMENTS

2016/0012973 A1* 1/2016 Takatani .............. H01G 9/0036
361/528
2017/0294273 A1* 10/2017 Andoralov ............. H01G 11/30
(Continued)

FOREIGN PATENT DOCUMENTS

JP 2017-037950 2/2017

*Primary Examiner* — Scott B Geyer
(74) *Attorney, Agent, or Firm* — McDermott Will & Emery LLP

(57) ABSTRACT

A method for manufacturing an electrolytic capacitor includes a first step, a second step, and a third step. In the first step, a capacitor element is formed. The capacitor element includes an anode body, a cathode body, and a separator. The anode body includes a dielectric layer formed on a surface of the anode body. And the separator is disposed between the anode body and the cathode body. In the second step, the capacitor element is impregnated with a treatment solution containing an acid component and a base component. In the third step, the capacitor element is, after the second step, impregnated with a conductive polymer dispersion in a state that a part of the treatment solution remains in the capacitor element. The conductive polymer dispersion is obtained by dispersing, in a solvent, conductive polymer particles each including polyanion. A pH of the treatment solution is higher than a pH of the conductive polymer dispersion.

25 Claims, 2 Drawing Sheets

(51) Int. Cl.
*H01G 9/00* (2006.01)
*H01G 9/048* (2006.01)
*H01G 9/15* (2006.01)

(52) U.S. Cl.
CPC .............. *H01G 9/028* (2013.01); *H01G 9/048* (2013.01); *H01G 9/151* (2013.01)

(58) Field of Classification Search
CPC ........ H01G 9/025; H01G 9/028; H01G 9/032; H01G 9/035
See application file for complete search history.

(56) References Cited

U.S. PATENT DOCUMENTS

| | | | |
|---|---|---|---|
| 2018/0218844 A1* | 8/2018 | Sato | H01G 9/028 |
| 2019/0304704 A1* | 10/2019 | Ishimaru | H01G 9/0029 |
| 2019/0341197 A1* | 11/2019 | Chen | H01G 9/0036 |

* cited by examiner

METHOD FOR MANUFACTURING ELECTROLYTIC CAPACITOR, AND ELECTROLYTIC CAPACITOR

BACKGROUND

1. Technical Field

The present disclosure generally relates to a method for manufacturing an electrolytic capacitor, and to an electrolytic capacitor. The present disclosure relates in detail to a method for manufacturing an electrolytic capacitor that includes a step of forming a capacitor element and a step of impregnating the capacitor element with a conductive polymer dispersion, and to an electrolytic capacitor.

2. Description of the Related Art

Unexamined Japanese Patent Publication No. 2017-37950 discloses a method for manufacturing a solid electrolytic capacitor. In the manufacturing method of Unexamined Japanese Patent Publication No. 2017-37950, polystyrene sulfonic acid is attached to a capacitor element formed by winding an anode foil and a cathode foil with a separator interposed between the anode foil and the cathode foil. After that, the capacitor element is immersed in a conductive polymer dispersion and dried to form a solid electrolyte layer. And then, a void portion in the capacitor element is filled with an electrolytic solution.

SUMMARY

A method for manufacturing an electrolytic capacitor according to a first aspect of the present disclosure includes a first step, a second step, and a third step. In the first step, a capacitor element is formed. The capacitor element includes an anode body, a cathode body, and a separator. The anode body includes a dielectric layer formed on a surface of the anode body The separator is disposed between the anode body and the cathode body. In the second step, the capacitor element is impregnated with a treatment solution containing an acid component and a base component. In the third step, the capacitor element is, after the second step, impregnated with a conductive polymer dispersion in a state that a part of the treatment solution remains in the capacitor element. The conductive polymer dispersion is obtained by dispersing, in a solvent, conductive polymer particles each including polyanion. A pH of the treatment solution is higher than a pH of the conductive polymer dispersion.

A method for manufacturing an electrolytic capacitor according to a second aspect of the present disclosure includes a first step, a second step, and a third step. In the first step, a capacitor element is formed. The capacitor element includes an anode body, a cathode body, and a separator. The anode body includes a dielectric layer formed on a surface of the anode body. The separator is disposed between the anode body and the cathode body. In the second step, the capacitor element is impregnated with a treatment solution containing a base component and boric acid as an acid component. In the third step, the capacitor element is, after the second step, impregnated with a conductive polymer dispersion. The conductive polymer dispersion is obtained by dispersing, in a solvent, conductive polymer particles each including polyanion.

An electrolytic capacitor according to a third aspect of the present disclosure includes a capacitor element including an anode body, a cathode body, and a separator. The anode body includes a dielectric layer formed on a surface of the anode body. The separator is disposed between the anode body and the cathode body. The capacitor element includes conductive polymer particles each including polyanion. And boric acid is present on a surface of the separator.

The methods for manufacturing an electrolytic capacitor according to the aspects of the present disclosure facilitate the impregnation of the conductive polymer dispersion into the capacitor element.

DETAILED DESCRIPTION OF EMBODIMENT

Figure 1:
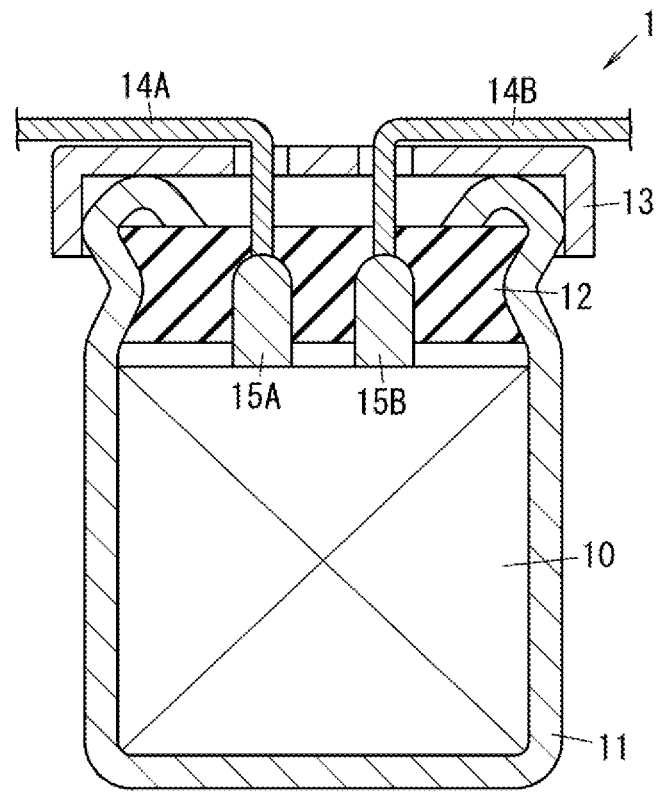
FIG. 1 is a schematic sectional view illustrating one example of an electrolytic capacitor according to an exemplary embodiment of the present disclosure.

In the manufacturing method of Unexamined Japanese Patent Publication No. 2017-37950, the conductive polymer dispersion could not be sufficiently impregnated into the capacitor element, and thus a conductive polymer may not be sufficiently attached to the separator.

The present disclosure provides a method for manufacturing an electrolytic capacitor that facilitates impregnation of a conductive polymer dispersion into a capacitor element and provides an electrolytic capacitor.

1. Outline

A method for manufacturing electrolytic capacitor 1 according to one exemplary embodiment of the present disclosure includes a first step, a second step, and a third step. In the first step, capacitor element 10 is formed (see FIG. 2). Capacitor element 10 includes anode body 21 having dielectric layer 210 formed on a surface of anode body 21, cathode body 22, and separator 23 disposed between anode body 21 and cathode body 22. In the second step, capacitor element 10 is impregnated with a treatment solution containing an acid component and a base component. In the third step, capacitor element 10 is, after the second step, impregnated with a conductive polymer dispersion in a state that a part of the treatment solution remains in capacitor element 10. The conductive polymer dispersion is obtained by dispersing, in a solvent, conductive polymer 250 particles each including polyanion (see FIG. 3). A pH of treatment solution is higher than a pH of the conductive polymer dispersion.

A method for manufacturing electrolytic capacitor 1 according to one exemplary embodiment of the present disclosure includes a first step, a second step, and a third step. In the first step, capacitor element 10 is formed (see FIG. 2). Capacitor element 10 includes anode body 21 having dielectric layer 210 formed on a surface of anode body 21, cathode body 22, and separator 23 disposed between anode body 21 and cathode body 22. In the second step, capacitor element 10 is impregnated with a treatment solution containing a base component and boric acid as an acid component. In the third step, capacitor element 10 is, after the second step, impregnated with a conductive polymer dispersion in a state that a part of the treatment solution remains in capacitor element 10. The conductive polymer dispersion is obtained by dispersing, in a solvent, conductive polymer 250 particles each including polyanion (see FIG. 3).

The present exemplary embodiments facilitate the impregnation of the conductive polymer dispersion into capacitor element 10 due to the acid component and the base component in the treatment solution.

The pH of treatment solution is higher than the pH of the conductive polymer dispersion. This also facilitates the impregnation of the conductive polymer dispersion into capacitor element 10.

The treatment solution contains boric acid as the acid component. This also facilitates the impregnation of the conductive polymer dispersion into capacitor element 10.

Thus, the methods for manufacturing electrolytic capacitor 1 according to the present exemplary embodiments facilitate the impregnation of the conductive polymer dispersion into capacitor element 10. Accordingly, to amount of conductive polymer 250 attached to separator 23 can be increased.

2. Details 2-1. Electrolytic Capacitor

Hereinafter, a configuration of electrolytic capacitor 1 according to a present exemplary embodiment is described in detail.

Electrolytic capacitor 1 includes, as illustrated in FIG. 1, capacitor element 10, bottomed case 11, sealing member 12, base plate 13, lead wires 14A, 14B, and lead tabs 15A, 15B.

(1) Bottomed Case

Bottomed case 11 is configured to be capable of housing capacitor element 10. Specifically, bottomed case 11 is a tubular member having an unopened bottom and an open top. Therefore, it is possible to put capacitor element 10 into bottomed case 11 through an opening of bottomed case 11. Bottomed case 11 is made of, for example, at least one material selected from the group consisting of aluminum, stainless steel, copper, iron, brass, and an alloy of these metals.

(2) Sealing Member and Base Plate

The opening of bottomed case 11 is sealed with sealing member 12. Sealing member 12 is made of, for example, a rubber material such as ethylene-propylene terpolymer (EPT) or isobutylene-isoprene rubber (IIR), or a resin material such as an epoxy resin. Sealing member 12 includes a pair of through-holes. Bottomed case 11 is, at a part near an opening end, processed inward by drawing, and is, at the opening end, curled and thus swaged to fix sealing member 12. Further, sealing member 12 is covered with base plate 13. Base plate 13 is made of, for example, an electrically insulating resin material.

(3) Lead Wire and Lead Tab

A pair of lead wires 14A, 14B are led out through the through-holes of sealing member 12 and penetrate base plate 13. A pair of lead tabs 15A, 15B are embedded in sealing member 12. Lead tab 15A electrically connects between lead wire 14A and an electrode (anode body 21) of capacitor element 10. Lead tab 15B electrically connects between lead wire 14B and an electrode (cathode body 22) of capacitor element 10.

(4) Capacitor Element

Hereinafter, capacitor element 10 housed in bottomed case 11 is described in detail.

Figure 2:
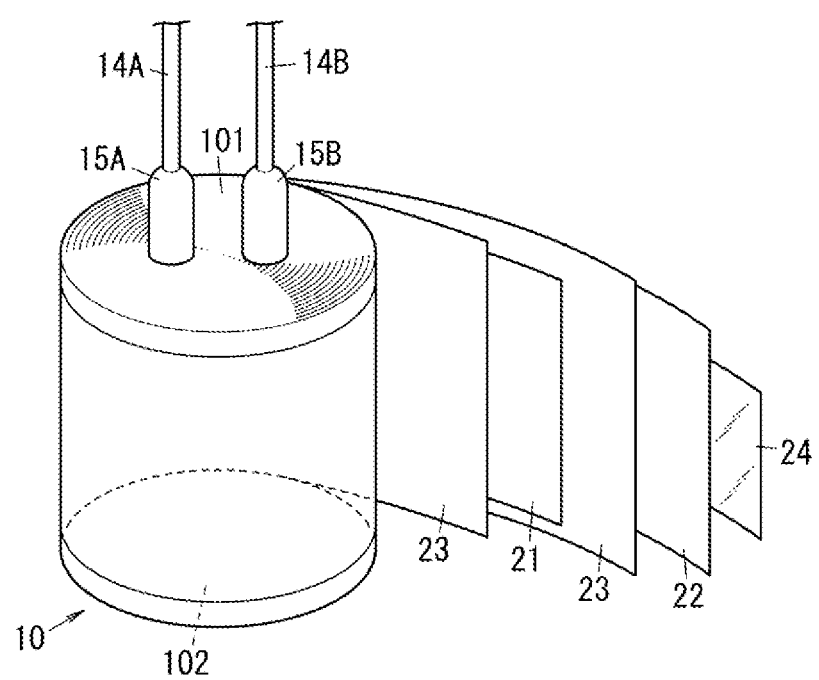
FIG. 2 is a schematic perspective view illustrating a partially developed capacitor element included in the electrolytic capacitor according to the exemplary embodiment of the present disclosure.

Capacitor element 10 of the present exemplary embodiment is a wound body as illustrated in FIG. 2. The wound body illustrated in FIG. 2 is capacitor element 10 that is extracted from electrolytic capacitor 1 illustrated in FIG. 1 and is partially developed.

As illustrated in FIG. 2, capacitor element 10 includes anode body 21, cathode body 22, and separator 23. Lead tab 15A is electrically connected to anode body 21, and lead tab 15B is electrically connected to cathode body 22. Thus, anode body 21 is electrically connected to lead wire 14A through lead tab 15A, and cathode body 22 is electrically connected to lead wire 14B through lead tab 15B.

Separator 23 is disposed between anode body 21 and cathode body 22. Anode body 21, cathode body 22, and separator 23 are wound in this state. Separator 23 is, for example, a nonwoven fabric containing a cellulose fiber, kraft, polyethylene terephthalate, polyphenylene sulfide, nylon, an aromatic polyamide, a polyimide, a polyamide-imide, a polyether-imide, rayon, hyaline, vinylon, or an aramid fiber. In the present exemplary embodiment, separator 23 preferably contains a cellulose fiber. An outermost periphery of capacitor element 10 is stuck with fastening tape 24 for fixation.

Figure 3:
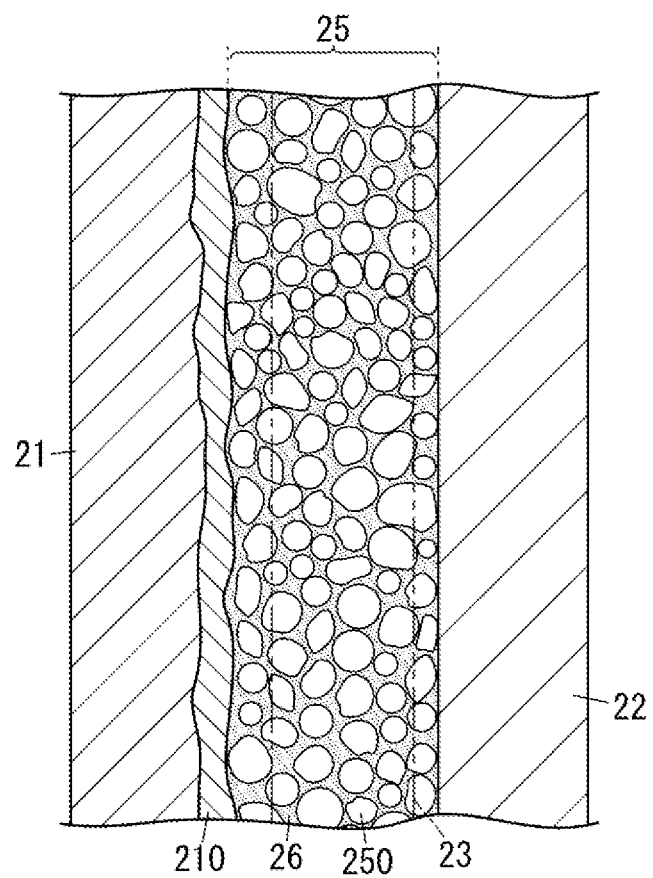
FIG. 3 is a schematic enlarged view illustrating formation of a solid electrolyte between an anode body and a cathode body in the capacitor element of the exemplary embodiment of the present disclosure.

In capacitor element 10, solid electrolyte 25 is formed between anode body 21 and cathode body 22. FIG. 3 shows a schematic enlarged view illustrating this state. As illustrated in FIG. 3, separator 23 holds solid electrolyte 25.

(4-1) Anode Body

As illustrated in FIG. 3, anode body 21 includes a metal foil and dielectric layer 210 formed on a surface of the metal foil. That is, capacitor element 10 includes anode body 21 having dielectric layer 210 formed on a surface of anode body 21.

The surface of the metal foil is roughened. This configuration is capable of increasing a surface area of the metal foil and thus increasing an area of dielectric layer 210 formed on the surface of the metal foil. A roughening method is not particularly limited, and it is possible to employ, for example, an etching method. A material for the metal foil is not particularly limited, but the material is preferably, for example, a valve metal such as aluminum, tantalum, niobium, or titanium, or an alloy containing a valve metal.

Dielectric layer 210 is formed by subjecting the surface of the metal foil to an anodizing treatment. This anodizing treatment forms, on the surface of the metal foil, an oxide coating film to become dielectric layer 210. As the anodizing treatment, it is possible to employ, for example, a method for applying a voltage to the metal foil while the metal foil is immersed in a treatment solution. The treatment solution is not particularly limited, and it is possible to use, for example, an ammonium adipate solution.

(4-2) Cathode Body

As cathode body 22, it is possible to use the same metal foil as the metal foil used for manufacturing anode body 21. A surface of cathode body 22 may be roughened. On the surface of cathode body 22, a layer containing, for example, titanium or carbon may be formed.

(4-3) Solid Electrolyte

As illustrated in FIG. 3, solid electrolyte 25 is in contact with dielectric layer 210 and is disposed between anode body 21 and cathode body 22. Solid electrolyte 25 is a porous material in which fine voids are present. It is possible to form solid electrolyte 25 by impregnating capacitor element 10 with a polymer dispersion containing a solvent and particles of conductive polymer 250 dispersed in the solvent, and volatilizing the solvent from capacitor element 10. That is, the particles of conductive polymer 250 are included in capacitor element 10. Conductive polymer 250 is attached to at least part of a surface of dielectric layer 210, and attached to at least part of surfaces of separator 23 and cathode body 22.

In the present exemplary embodiment, boric acid is preferably present on the surface of separator 23. This boric acid is capable of improving impregnating ability of the conductive polymer dispersion into separator 23. This enables an increase in amount of conductive polymer 250 attached to separator 23. It is also possible to improve impregnating ability of electrolytic solution 26 into capacitor element 10. Boric acid that is present on the surface of separator 23 may cover a surface of the fiber in separator 23 or may be attached to the surface of separator 23 in an island shape.

As the solvent, it is possible to use a volatile liquid component. As the volatile liquid component, it is possible to use, for example, water, a nonaqueous solvent, or a mixture of water with a nonaqueous solvent. As the nonaqueous solvent, it is possible to use a protic solvent or an aprotic solvent. The protic solvent can include, for example, at least one of alcohols or ethers. As the alcohols, the protic solvent can include, for example, at least one selected from the group consisting of methanol, ethanol, propanol, butanol, ethylene glycol, and propylene glycol. As the ethers, the protic solvent can include, for example, at least one of formaldehyde or 1,4-dioxane. The aprotic solvent can include, for example, at least one selected from the group consisting of amides, esters, and ketones. As the amides, the aprotic solvent can include, for example, at least one selected from the group consisting of N-methylacetamide, N,N-dimethylformamide, and N-methyl-2-pyrrolidone. As the esters, the aprotic solvent can include, for example, methyl acetate. As the ketones, the aprotic solvent can include, for example, methyl ethyl ketone.

Conductive polymer 250 preferably includes, for example, at least one component selected from the group consisting of polypyrrole, polythiophene, polyaniline, and derivatives of these compounds. Examples of the derivative of polythiophene include poly(3,4-ethylenedioxythiophene) (PEDOT). Conductive polymer 250 may include a homopolymer or may include a copolymer. A weight-average molecular weight of conductive polymer 250 is not particularly limited and ranges, for example, from 1000 to 100000, inclusive. An average particle size of the particles of conductive polymer 250 is not particularly limited and ranges preferably from 50 nm to 1000 nm, inclusive, more preferably from 100 nm to 500 nm, inclusive, for example. The average particle size used in the present specification means an average value of particle sizes of grains and/or aggregates that constitute a particle size distribution peak. In particle size distribution measurement according to a dynamic light scattering method, when at least part of conductive polymer grains to be measured becomes aggregated to form an aggregate in a solvent, measured as the particle size is a particle size of the aggregate. It is possible to determine the average particle size derived from the particle size distribution peak, by particle size distribution measurement according to the dynamic light scattering method.

Conductive polymer 250 of the present exemplary embodiment includes a polyanion. The polyanion functions as a dopant. This dopant allows conductive polymer 250 to exhibit electric conductivity. The polyanion is, for example, polymeric sulfonic acid. In this case, compared to cases where the conductive polymer contains a single molecule acid component as the dopant, the dopant is less likely to be separated from conductive polymer 250, and is particularly less likely to be separated from conductive polymer 250 even at a high temperature.

As the polymeric sulfonic acid, the polyanion can include, for example, at least one selected from the group consisting of polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), and polyisoprenesulfonic acid.

The polyanion particularly preferably includes polystyrenesulfonic acid. In this case, conductive polymer 250 is considered to be bonded with side chains of polystyrenesulfonic acid in an island shape and a dispersed manner. Thus, the dopant is less likely to be separated from conductive polymer 250, and is particularly less likely to be separated from conductive polymer 250 even at a high temperature.

(4-4) Electrolytic Solution

Capacitor element 10 is impregnated with electrolytic solution 26.

Specifically, electrolytic solution 26 infiltrates into a plurality of voids in solid electrolyte 25. Thus, electrolytic solution 26 is in contact with dielectric layer 210 and solid electrolyte 25.

Electrolytic solution 26 contains a solvent and an acid component (corresponding to a second acid component described later). An oxidation action of this acid component is capable of repairing a defect of dielectric layer 210. Specifically, in dielectric layer 210, it is possible to oxidize an exposed part of metal foil of anode body 21 to form dielectric layer 210.

The solvent can contain, for example, at least one component selected from the group consisting of a glycol compound, a sulfone compound, a lactone compound, a carbonate compound, an alcohol, and a polyol.

As the glycol compound, the solvent can contain, for example, at least one selected from the group consisting of ethylene glycol (EG), diethylene glycol, triethylene glycol, propylene glycol, polyethylene glycol (PEG), and a polyalkylene glycol.

As the sulfone compound, the solvent can contain, for example, at least one component selected from the group consisting of sulfolane, 3-methylsulfolane, dimethyl sulfoxide, and diethyl sulfoxide.

As the lactone compound, the solvent can contain, for example, at least one selected from the group consisting of γ-butyrolactone, ß-butyrolactone, α-valerolactone, and γ-valerolactone.

As the carbonate compound, the solvent can contain, for example, at least one component selected from the group consisting of dimethyl carbonate (DMC), diethyl carbonate (DEC), ethyl methyl carbonate (EMC), ethylene carbonate (EC), propylene carbonate (PC), and fluoroethylene carbonate (FEC).

As the alcohol, the solvent can contain at least one selected from the group consisting of methanol, ethanol, propanol, butanol, cyclobutanol, cyclohexanol, methyl cellosolve, and ethyl cellosolve.

The solvent contains preferably a glycol compound, particularly preferably ethylene glycol or propylene glycol. In this case, it is possible to suppress a decrease of the solvent in electrolytic solution 26 caused by evaporation of the solvent through a gap between bottomed case 11 and sealing member 12 and through sealing member 12.

The solvent may contain a polyol having three or more hydroxy groups and particularly preferably contains at least one of glycerin or polyglycerin. In this case, it is easy to suppress a decrease of the solvent in electrolytic solution 26 and to keep electrolytic solution 26 present around conductive polymer 250.

The acid component preferably contains an organic acid. As the organic acid, the acid component can contain, for example, at least one selected from the group consisting of phthalic acid, isophthalic acid, terephthalic acid, maleic acid, adipic acid, benzoic acid, toluic acid, enanthic acid, malonic acid, 1,6-decanedicarboxylic acid, 1,7-octanedicarboxylic acid, azelaic acid, salicylic acid, oxalic acid, and glycolic acid.

The acid component may contain an inorganic acid. As the inorganic acid, the acid component can contain, for example, at least one selected from the group consisting of boric acid, phosphoric acid, phosphorus acid, hypophosphorus acid, borate ester, phosphate ester, carbonic acid, and silicic acid.

The acid component also preferably contains, for example, a composite acid compound of the organic acids and the inorganic acids described above. As the composite acid compound, the acid component preferably contains at least one selected from the group consisting of borodisalicylic acid, borodiglycolic acid, and borodioxalic acid.

Further, a polymeric acid component may be used as the acid component. As the polymeric acid component, the acid component can contain, for example, at least one selected from the group consisting of polyacrylic acid, polymethacrylic acid, polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), and polyisoprenesulfonic acid.

Electrolytic capacitor 1 sometimes generates heat due to a flow of ripple current. In such a case, the composite acid compound and the polymeric acid component are preferable because the composite acid compound and the polymeric acid component have excellent thermal stability.

Electrolytic solution 26 can contain a component other than the solvent and the acid component. Electrolytic solution 26 can contain, for example, a base component (corresponding to a second base component described later). In this case, it is possible to neutralize at least part of the acid component and thus suppress corrosion of an electrode attributed to the acid component while increasing a concentration of the acid component.

In electrolytic solution 26, an equivalent ratio of the acid component is preferably greater than an equivalent ratio of the base component. In this case, it is possible to effectively suppress a dedoping phenomenon. The equivalent ratio of the acid component to the base component preferably ranges from 1.0 to 30, inclusive. A concentration of the base component in the liquid component ranges preferably from 0.1% by mass to 20% by mass, inclusive, more preferably from 3% by mass to 10% by mass, inclusive.

The base component preferably contains at least one component selected from the group consisting of a primary amine compound, a secondary amine compound, a tertiary amine compound, an ammonium compound, a quaternary ammonium compound, and an amidine compound. These components have high heat resistance to be capable of suppressing degradation of electrolytic solution 26 attributed to heat. Examples of these components include methylamine, dimethylamine, trimethylamine, dimethylethylamine, ethylamine, diethylamine, triethylamine, ethylenediamine, N,N-diisopropylethylamine, tetramethylethylenediamine, hexamethylenediamine, spermidine, spermine, amantadine, aniline, phenethylamine, toluidine, pyrrolidine, piperidine, piperazine, morpholine, imidazole, pyridine, pyridazine, pyrimidine, pyrazine, 4-dimethylaminopyridine, ammonium, diethyldimethylammonium, 1,2,3-trimethylimidazolinium, 1,2,3,4-tetramethylimidazolinium, 1,3-dimethyl-2-ethyl-imidazolinium, 1,3,4-trimethyl-2-ethylimidazolinium, and a 1,3-dimethyl-2-heptylimidazolinium salt. The base component can contain at least one of these components.

Electrolytic solution 26 may also contain a component other than the solvent, the acid component, and the base component, such as an additive agent.

Electrolytic solution 26 has a pH of preferably less than or equal to 4, more preferably less than or equal to 3.8, further preferably less than or equal to 3.6. Electrolytic solution 26 having a pH of less than or equal to 4 easily suppresses the dedoping phenomenon. A lower limit value of the pH of electrolytic solution 26 is not particularly limited and is, for example, more than or equal to 2.0.

2-2. Method for Manufacturing Electrolytic Capacitor

Hereinafter, described are steps of one exemplary method for manufacturing electrolytic capacitor 1 according to the present exemplary embodiment. The method for manufacturing electrolytic capacitor 1 according to the present exemplary embodiment includes a first step, a second step, and a third step and further includes a fourth step and a fifth step.

(1) First Step

In the first step, capacitor element 10 is produced. Capacitor element 10 includes anode body 21 having dielectric layer 210 formed on a surface of anode body 21, cathode body 22, and separator 23 disposed between anode body 21 and cathode body 22. In the first step, production of anode body 21, production of cathode body 22, and production of capacitor element 10 are preferably performed.

(1-1) Production of Anode Body

A metal foil as a raw material for anode body 21 is prepared. Specifically, it is possible to produce anode body 21 by cutting a large roll-shaped metal plate.

Roughening a surface of this metal foil enables formation of a plurality of fine projections and recesses on the surface of the metal foil. It is possible to roughen the surface of the metal foil by, for example, etching the metal foil. As the etching, it is possible to employ, for example, a direct current electrolytic method or an alternate current electrolytic method.

Next, dielectric layer 210 is formed on the roughened surface of the metal foil. A method for forming dielectric layer 210 is not particularly limited, and it is possible to form the dielectric layer by, for example, subjecting the metal foil to an anodizing treatment. In the anodizing treatment, the roughened metal foil is, for example, immersed in an anodizing treatment solution such as an ammonium adipate solution and then heated or subjected to voltage application. These procedures give anode body 21 having dielectric layer 210 formed on the surface of anode body 21. Lead wire 14A is electrically connected to anode body 21. A method for connecting anode body 21 to lead wire 14A is not particularly limited, and it is possible to use, for example, swage joining or ultrasonic welding. In the present exemplary embodiment, anode body 21 is electrically connected to lead wire 14A through lead tab 15Ak (1-2) Production of Cathode Body It is possible to produce cathode body 22 from a metal foil by the same method as for anode body 21. Specifically, it is possible to produce cathode body 22 by cutting a large roll-shaped metal plate.

Lead wire 14B is electrically connected to cathode body 22. A method for connecting cathode body 22 to lead wire 14B is not particularly limited, and it is possible to use, for example, swage joining or ultrasonic welding. In the present exemplary embodiment, cathode body 22 is electrically connected to lead wire 14B through lead tab 15B.

As necessary, a surface of cathode body 22 may be roughened, or a layer including an oxide coating film or a conductive layer of, for example, titanium or carbon may be formed on a surface of cathode body 22.

(1-3) Production of Capacitor Element

Using anode body 21, cathode body 22, and separator 23 described above, a wound body (capacitor element 10) illustrated in FIG. 2 is produced. Specifically, anode body 21, separator 23, and cathode body 22 are stacked in this order and concentrically wound to produce a wound body. An end of cathode body 22 positioned at an outermost layer of the wound body is fixed with fastening tape 24. These procedures enable production of capacitor element 10 illustrated in FIG. 2. Further, sealing member 12 is disposed so that lead wires 14A, 14B extracted from anode body 21 and cathode body 22 are led out from through-holes in sealing member 12.

(2) Second Step

In the second step, capacitor element 10 produced in the first step is impregnated with a treatment solution containing an acid component and a base component. Here, in order to distinguish the acid component and the base component contained in the treatment solution used in the second step from an acid component and a base component contained in an electrolytic solution used in the fourth step described later, the acid component and the base component contained in the treatment solution are referred to a first acid component and a first base component, respectively in the present specification. The acid component and the base component contained in the electrolytic solution are referred to as a second acid component and a second base component, respectively.

The first acid component is a component having a property of reacting with a hydroxy group that is present on a surface of separator 23. The first acid component can contain, for example, at least one component selected from the group consisting of boric acid, phosphoric acid, adipic acid, citric acid, malonic acid, and tartaric acid. This first acid component reacts with the hydroxy group on the surface of separator 23 so as to reform the surface of separator 23.

The first base component is a component capable of introducing a proton that bonds the hydroxy group on the surface of separator 23 with an acidic functional group such as a sulfo group contained in a polyanion of a conductive polymer. The first base component contains, for example, ammonium. The hydroxy group on the surface of separator 23 is considered to be, through a proton, bonded with the acidic functional group contained in the polyanion of the conductive polymer. This proton is introduced by the first base component to be capable of weakening an interaction between the surface of separator 23 and the polyanion of the conductive polymer. By weakening this interaction, it is possible to suppress stagnation of a conductive polymer dispersion around end surfaces 101, 102 of capacitor element 10. And thus the conductive polymer dispersion can be easily impregnated into an inside of capacitor element 10. Accordingly, in capacitor element 10, it is possible to dispose, through separator 23, conductive polymer 250 particles as far as an inner portion (surface of fiber in separator 23, a surface of dielectric layer 210, and a surface of cathode body 22 away from end surfaces 101, 102) of capacitor element 10. The first acid component and the first base component may be ionized in the treatment solution.

Boric acid as the first acid component is preferable because boric acid is less likely to allow aggregation of the conductive polymer 250 particles in the conductive polymer dispersion and to allow a rise in viscosity of the conductive polymer dispersion. The aggregation of the conductive polymer 250 particles in the conductive polymer dispersion or the rise in viscosity of the conductive polymer dispersion makes it difficult for the conductive polymer dispersion to impregnate into the inside of capacitor element 10.

In the present exemplary embodiment, capacitor element 10 is impregnated with the treatment solution containing boric acid as the first acid component and the first base component to be capable of attaching boric acid to separator 23. Boric acid, which has moisture absorbency, is attached to separator 23 to be capable of absorbing moisture in separator 23 and thus increasing a space for impregnation with the conductive polymer dispersion in separator 23. Thus, impregnating ability of the conductive polymer dispersion into separator 23 is improved to be capable of also improving impregnating ability of the conductive polymer dispersion into capacitor element 10.

The first acid component and the first base component in the treatment solution are also preferably formed by dissolving a salt of the first acid component with the first base component in the treatment solution. For example, boric acid in the treatment solution is preferably derived from a boric acid compound that is a hydrate. That is, the treatment solution is one obtained by dissolving a boric acid compound, and boric acid compound is preferably a hydrate. The boric acid compound is dissolved in the treatment solution to generate boric acid, which is capable of reforming the surface of separator 23. The dissolution also allows attachment of boric acid to separator 23 to enable improvement in the impregnating ability of the conductive polymer dispersion into separator 23 and also improvement in the impregnating ability of the conductive polymer dispersion into capacitor element 10.

After the second step but before the impregnation of capacitor element with the conductive polymer dispersion (before the third step), part of the first acid component in the treatment solution preferably remains in capacitor element 10, and further part of the first base component in the treatment solution preferably remains in capacitor element 10. When capacitor element 10 is impregnated with the conductive polymer dispersion, the first acid component that remains in capacitor element 10 is re-dissolved to facilitate the impregnation of the conductive polymer dispersion into capacitor element 10. For example, when the first acid component is boric acid, boric acid is present on the surface of the fiber in separator 23. This boric acid is re-dissolved in the conductive polymer dispersion to facilitate the impregnation of the conductive polymer dispersion into capacitor element 10. Further, the first base component that remains in capacitor element 10 is also capable of improving the impregnating ability of the conductive polymer dispersion into capacitor element 10. A remaining amount of the first acid component and a remaining amount of the first base component change depending on drying conditions (temperature and a period) for drying capacitor element 10 that has been impregnated with the treatment solution and concentrations of the first acid component and the first base component in the treatment solution. In the meantime, the first acid component that remains may contain a reactant of the first acid component with another component, and the first base component that remains may contain a reactant of the first base component with another component.

Depending on a type of the first base component that remains in capacitor element 10, the first base component that remains in capacitor element 10 may possible decrease conductivity (electric conductivity) of the conductive polymer to increase equivalent series resistance (ESR) of electrolytic capacitor 1. Regarding this point, when the first base component is ammonium, it is less likely to decrease conductivity of the conductive polymer. It is considered that because ammonium is less likely to remain in capacitor element 10 because ammonium has high volatility. Thus, the first base component in the present exemplary embodiment is preferably ammonium.

Further, the boric acid compound is preferably ammonium borate. Specifically, the boric acid compound is preferably a hydrate of ammonium borate. Examples of the hydrate of ammonium borate include ammonium tetraborate tetrahydrate $((NH_4)_2B_4O_7 \cdot 4H_2O))$ and ammonium pentaborate octahydrate $((NH_4)_{20} \cdot 5B_2O_3 \cdot 8H_2O)$. Particularly, ammonium pentaborate octahydrate is preferable. When the boric acid compound is ammonium borate, boric acid improves the impregnating ability of the conductive polymer dispersion into separator 23 while ammonium as the first base component suppresses a rise in viscosity of the conductive polymer dispersion and enables the impregnation of the conductive polymer dispersion into capacitor element 10.

A proportion of the boric acid compound in the treatment solution preferably ranges from 0.1% by weight to 5.0% by weight, inclusive. In this case, when the proportion of the boric acid compound in the treatment solution is more than or equal to 0.1% by weight, the conductive polymer dispersion can be sufficiently impregnated with separator 23. When the proportion of the boric acid compound in the treatment solution is less than or equal to 5.0% by weight, is capable of reducing the first base component that remains in capacitor element 10 can be reduced to suppress a decrease in conductivity of the conductive polymer.

In the present exemplary embodiment, a pH of the treatment solution is higher than a pH of the conductive polymer dispersion. In this case, the first base component contained in the treatment solution is capable of effectively introducing a proton. Further, by impregnating in advance capacitor element 10 with the treatment solution having a higher pH than the conductive polymer dispersion, wettability of the conductive polymer dispersion to separator 23 and the foils (anode body 21 and cathode body 22) can be improved even when the conductive polymer dispersion has a lower pH than the treatment solution. It is considered that this effect is due to suppression of interference between conductive polymer 250 and separator 23 as well as conductive polymer 250 and the foils because surface potentials of the conductive polymer 250 particles become close to zero. As a result, the impregnation of the conductive polymer dispersion into capacitor element 10 is facilitated so that amount of conductive polymer 250 attached to separator 23 can be increased.

The pH of the treatment solution is preferably more than or equal to 6. In this case, the impregnation of separator 23 with the conductive polymer dispersion is particularly facilitated, and thus the conductive polymer dispersion particularly is likely to impregnate into capacitor element 10. The pH of the treatment solution is more preferably more than or equal to 7.0. An upper limit value of the pH of the treatment solution is not particularly limited but is preferably less than or equal to 9.5, more preferably less than or equal to 9.0.

A temperature of the treatment solution is preferably lower than or equal to 45° C., more preferably lower than or equal to 35° C. In this case, it is possible to suppress evaporation of the first base component contained in the treatment solution. Thereby, it is possible to suppress a change in pH of the treatment solution, allowing the first base component to effectively introduce a proton. Particularly, when the first base component is ammonium, the evaporation of ammonium is easily suppressed and thus the change in pH of the treatment solution is easily suppressed.

In the second step, a voltage may be applied between anode body 21 and cathode body 22 while capacitor element 10 is immersed in the treatment solution. This case enables formation of dielectric layer 210 on sections of anode body 21 positioned on end surfaces 101, 102 of capacitor element 10 and an anode body 21—exposed portion where no dielectric layer 210 is formed. After that, capacitor element 10 may be washed, but need not be washed. When capacitor element 10 is washed, it is preferable to wash capacitor element 10 so that part of the treatment solution remains in capacitor element 10.

In the second step, capacitor element 10 is preferably dried after capacitor element 10 has been impregnated with the treatment solution. As described above, the first acid component and the first base component in the treatment solution preferably remain in capacitor element 10. Hence, a temperature for drying capacitor element 10 is preferably a temperature that enables the first acid component and the first base component to remain in the capacitor element. Further, a period for drying capacitor element 10 is preferably a period that enables the first acid component and the first base component to remain in the capacitor element. Further, when capacitor element 10 is impregnated with the conductive polymer dispersion, it is preferable to evaporate moisture in the capacitor element. Hence, the temperature for drying capacitor element 10 is preferably a temperature that enables at least water to evaporate.

(3) Third Step

In the third step, capacitor element 10 is impregnated with the conductive polymer dispersion in a state that part of the treatment solution remains in capacitor element 10. This conductive polymer dispersion contains a solvent and conductive polymer 250 particles dispersed in the solvent. In the third step, it is possible to form solid electrolyte 25 containing conductive polymer 250 on the surface of dielectric layer 210 and also attach solid electrolyte 25 to the surface of separator 23 and the surface of cathode body 22.

The impregnation of capacitor element 10 with the treatment solution containing the first acid component and the first base component in the second step described above facilitates the impregnation of the conductive polymer dispersion into capacitor element 10 in the third step. Specifically, the first acid component in the treatment solution reforms the surface of separator 23. Further, the first acid component attached to the surface of separator 23 is re-dissolved in the conductive polymer dispersion to improve the impregnating ability of the conductive polymer dispersion. Further, a proton is introduced by the first base component in the treatment solution to weaken the interaction between the surface of separator 23 and the polyanion. As a result, the conductive polymer dispersion is less likely to stagnate around end surfaces 101, 102 of capacitor element 10, and thus the impregnation of the conductive polymer dispersion into capacitor element 10 and into a gap in the wound body is facilitated.

Particularly, when the first acid component is boric acid as in the present exemplary embodiment, boric acid is preferably attached on at least a part of the surface of the fiber in separator 23 right before the third step. Specifically, by drying capacitor element 10 that has been impregnated with the treatment solution, crystallized boric acid is considered to be attached to separator 23. It is considered that this boric acid absorbs moisture in separator 23 to widen a space for enabling the impregnation with the conductive polymer dispersion in separator 23. In this case, separator 23 preferably contains a cellulose fiber. Since the cellulose fiber contains relatively much moisture among fibers that are usable as separator 23, boric acid is more likely to exhibit an effect of improving the impregnating ability of the conductive polymer dispersion. Further, boric acid is re-dissolved in the conductive polymer dispersion to improve the impregnating ability of the conductive polymer dispersion. As a result, the impregnation of the conductive polymer dispersion into capacitor element 10 is facilitated, and thus amount of conductive polymer 250 attached to separator 23 can be increased.

In the present exemplary embodiment, the pH of the treatment solution is higher than the pH of the conductive polymer dispersion. Hence, an introduction of a proton by the first base component can be effectively conducted, and thus the impregnation of the conductive polymer dispersion into capacitor element 10 and into a gap in the wound body can be facilitated. Further, the wettability of the conductive polymer dispersion to separator 23 and the foils (anode body 21 and cathode body 22) can be improved even when the conductive polymer dispersion has a low pH. Specifically, the pH of the conductive polymer dispersion may be less than or equal to 5. Even in this case, the impregnation of the conductive polymer dispersion into capacitor element 10 and into a gap in the wound body can be facilitated.

In the present exemplary embodiment, the impregnation of the conductive polymer dispersion into capacitor element 10 is facilitated as described above, and thus amount of conductive polymer 250 attached to separator 23 can be increased. Thus, it is possible to reduce the ESR of electrolytic capacitor 1. Even when electrolytic capacitor 1 generates heat by being used in a state of, for example, allowing ripple current to flow in electrolytic capacitor 1, electrolytic capacitor 1 is less likely to raise the ESR or lower electrostatic capacity. Accordingly, electrolytic capacitor 1 can attain a long life.

The step of impregnating capacitor element 10 with the conductive polymer dispersion may be repeated two or more times. In this case, amount of solid electrolyte 25 in contact with dielectric layer 210 can be increased.

(4) Fourth Step

In the fourth step, capacitor element 10 that has been impregnated with the conductive polymer dispersion is impregnated with electrolytic solution 26. That is, the method for manufacturing electrolytic capacitor 1 according to the present exemplary embodiment includes, after the third step, the fourth step of impregnating capacitor element 10 with electrolytic solution 26. This enables impregnation of electrolytic solution 26 into fine voids in solid electrolyte 25. Further, electrolytic solution 26 is in contact with dielectric layer 210 and solid electrolyte 25. By impregnating capacitor element 10 with the treatment solution, the impregnation of electrolytic solution 26 into capacitor element 10 is facilitated, and thus the impregnation of electrolytic solution 26 into a gap in the wound body is facilitated.

Before impregnating capacitor element 10 with electrolytic solution 26, the first base component is preferably volatilized in advance. That is, the method for manufacturing electrolytic capacitor 1 according to the present exemplary embodiment preferably includes a step of volatilizing the first base component after the third step but before the fourth step. In this case, it is possible to suppress a decrease in conductivity of the conductive polymer due to the first base component that remains in electrolytic solution 26. Specifically, after the impregnation of capacitor element 10 with the conductive polymer dispersion (third step) but before the impregnation of capacitor element 10 with electrolytic solution 26, the first base component is volatilized by drying capacitor element 10.

In the present exemplary embodiment, by the impregnation of capacitor element 10 with the treatment solution in the second step described above, the impregnation of capacitor element 10 with the electrolytic solution is facilitated.

(5) Fifth Step

In the fifth step, capacitor element 10 is, after the fourth step, encapsulated in bottomed case 11 to complete electrolytic capacitor 1. That is, capacitor element 10 is housed in bottomed case 11 so that lead wires 14A, 14B are positioned on an opening side of bottomed case 11. After that, sealing member 12 that has been formed so as to allow lead wires 14A, 14B to penetrate the sealing member is disposed above capacitor element 10. As a result, capacitor element 10 is encapsulated in bottomed case 11. Then, bottomed case 11 is, at part near an opening end, processed by drawing and is further curled at the opening end. And base plate 13 is disposed on curled part.

These steps give electrolytic capacitor 1 illustrated in FIG. 1. Then, an aging treatment of applying a rated voltage may be performed.

2-3. Use Application of Electrolytic Capacitor

Use application of electrolytic capacitor 1 is not particularly limited. Electrolytic capacitor 1 can be used in, for example, a substrate for an engine control unit (ECU) of an automobile or in a switching power source. This automobile is assumed to be mainly, for example, an electric car or a hybrid car but may also be a gasoline engine car or a diesel engine car. Electrolytic capacitor 1 may also be used in, for example, a two-wheel vehicle (including an electric motorcycle), an aircraft, a ship, and a drone. Electrolytic capacitor 1 may also be used in, for example, a power-supply device of a central processing unit (CPU) of a server device, a computer device, a home-use game machine, and the like. In addition, electrolytic capacitor 1 may also be used in, for example, a power-supply device of a field-programmable gate array (FPGA) in a communication device, industrial equipment, and the like as well as a power-supply device of a graphics processing unit (GPU) in a graphic board and the like. The use application of electrolytic capacitor 1 is not limited to these examples, but the electrolytic capacitor is usable in various fields.

2-4. Modified Example

The configuration of electrolytic capacitor 1 is not limited to the configuration described above in the exemplary embodiment.

For example, capacitor element 10 need not be a wound body, and may be a chip-type capacitor element including a metal sintered body as the anode body or may also be a laminate-type capacitor element including a metal plate as the anode body.

For example, electrolytic capacitor 1 need not contain electrolytic solution 26. That is, capacitor element 10 need not be impregnated with electrolytic solution 26. In this case, electrolytic capacitor 1 is a so-called solid electrolytic capacitor. When electrolytic capacitor 1 contains no electrolytic solution 26, the method for manufacturing electrolytic capacitor 1 need not include the step of impregnating capacitor element 10 with electrolytic solution 26 (fourth step).

EXAMPLES

Hereinafter, the method for manufacturing electrolytic capacitor 1 according to the present exemplary embodiment is described in more detail based on examples. The method for manufacturing electrolytic capacitor 1, however, is not limited to contents of the examples below.

Examples 1 to 8 and Comparative Examples 1 and 2

Hereinafter, a method for manufacturing electrolytic capacitors according to Examples 1 to 8 and Comparative Examples 1 and 2 is specifically described.
(Preparation of Anode Body)
A 100-μm-thick aluminum foil was subjected to etching to roughen a surface of the aluminum foil. Then, a dielectric layer was formed on the surface of the aluminum foil by an anodizing treatment. The anodizing treatment was performed by immersing the aluminum foil in an ammonium adipate solution and applying a voltage of 45 V to the aluminum foil. Then, the aluminum foil was cut into a size of 9 mm (length)×220 mm (width) to prepare an anode body.
(Preparation of Cathode Body)
A 50-μm-thick aluminum foil was subjected to etching to roughen a surface of the aluminum foil. Then, the aluminum foil was cut into a size of 9 mm (length)×230 mm (width) to prepare a cathode body.
(Production of Wound Body)
An anode lead tab and a cathode lead tab were connected to the anode body and the cathode body, respectively, and the anode body and the cathode body were wound with a separator interposed between the anode body and the cathode body while the lead tabs were rolled in the anode body, the cathode body, and the separator. Ends of the lead tabs protruding from the wound body were connected to an anode lead wire and a cathode lead wire, respectively.
(Preparation of Treatment Solution)
A treatment solution was prepared that contained a first acid component and a first base component shown in Table 1 and water. The first acid component and the first base component in the treatment solution were in a state of a salt of the first acid component with the first base component and were blended in a ratio shown in Table 1. A pH of the treatment solution was a value shown in Table 1.
(Impregnation with Treatment Solution)
The wound body was impregnated with the treatment solution by immersing the wound body in the treatment solution housed in a predetermined container and kept at 35° C.
(Drying of Wound Body)
The wound body picked up from the treatment solution was dried under conditions of 105° C. and one hour to volatilize the first base component contained in the treatment solution from the wound body while allowing the first acid component contained in the treatment solution to remain in the wound body. An end of an outer surface of the wound body was fixed with a fastening tape.
(Preparation of Polymer Dispersion)
A mixed solution was prepared by mixing 3,4-ethylenedioxythiophene and a polymer dopant, i.e., polystyrenesulfonic acid (PSS, weight-average molecular weight 100000) in ion-exchanged water (liquid component). While the mixed solution was stirred, iron (III) sulfate (oxidant) that had been dissolved in ion-exchanged water was added to the mixed solution to cause a polymerization reaction. After the reaction, a resultant reaction solution was dialyzed to remove unreacted monomers and an excessive oxidant, so that a polymer dispersion containing about 5% by mass of poly(3,4-ethylenedioxythiophene) doped with PSS (PEDOT/PSS) was obtained. A pH of this polymer dispersion was adjusted to a value shown in Table 1.
(Formation of Solid Electrolyte Layer)
The wound body was immersed in the polymer dispersion housed in a predetermined container in a reduced-pressure atmosphere (40 kPa) for 5 minutes, and then the wound body was picked up from the polymer dispersion. Next, the wound body that had been impregnated with the polymer dispersion was dried in a drying furnace at 150° C. for 20 minutes to form a solid electrolyte layer covering at least part of the dielectric layer.
(Preparation of Electrolytic Solution)
As a solvent of an electrolytic solution, ethylene glycol and sulfolane were used. As an acid component (second acid component) for a solute, phthalic acid was used. As a base component (second base component) for the solute, triethylamine was used. The solvent and the solute were used to prepare an electrolytic solution.

As the electrolytic solution, a solution obtained by dissolving phthalic acid and triethylamine as the solute in the solvent containing ethylene glycol and sulfolane at a ratio by mass of 1:1 was used. In the electrolytic solution, a concentration of the phthalic acid component was 20% by mass, and a concentration of the triethylamine component was 5% by mass.
(Impregnation with Electrolytic Solution)
The capacitor element was immersed in the electrolytic solution in a reduced-pressure atmosphere (40 kPa) for 5 minutes to impregnate the capacitor element with the electrolytic solution.
(Encapsulation of Capacitor Element)
The capacitor element that had been impregnated with the electrolytic solution was encapsulated to complete an electrolytic capacitor. Specifically, the capacitor element was housed in a bottomed case so that lead wires were positioned on an opening side of the bottomed case. And a sealing member (an elastic material including butyl rubber as a rubber component) that had been formed so as to allow the lead wires to penetrate the sealing member was disposed above the capacitor element. The capacitor element was encapsulated in the bottomed case. Then, the bottomed case was, at part near an opening end, processed by drawing and was further curled at the opening end. And a base plate was disposed on curled part to complete the electrolytic capacitor illustrated in FIG. 1. Then, an aging treatment of applying a voltage of 32 V was performed at 100° C. for 2 hours.
[Evaluation]
(1) Measurement of Initial ESR
The electrolytic capacitor was measured for an ESR value (initial ESR value) (mΩ) at a frequency of 100 kHz, in an environment of 20° C., using a 4-terminal LCR meter. Table 2 shows results of the measurement.

(2) Measurement of Initial Electrostatic Capacity

The electrolytic capacitor was measured for electrostatic capacity (initial electrostatic capacity) (μF) at a frequency of 120 kHz, in an environment of 20° C., using a 4-terminal LCR meter. Table 2 shows results of the measurement.

(3) Reliability

As reliability evaluation, a rated voltage (25 V) was applied to the electrolytic capacitor at a temperature of 145° C. for 1000 hours (reliability test), and then an ESR value (mΩ) and electrostatic capacity (μF) were measured by the same method as described above. Table 2 shows results of the measurement. The electrostatic capacity after the reliability test represents a rate of change (%) in the electrostatic capacity [100×(initial electrostatic capacity−electrostatic capacity after reliability test)/(initial electrostatic capacity)].

TABLE 1

|  | Treatment solution | | | | Conductive polymer |
|---|---|---|---|---|---|
|  | First acid component | First base component | Salt [wt %] | pH | dispersion pH |
| Example 1 | Boric acid | Ammonium | 1.0 | 8.5 | 3.0 |
| Example 2 | Boric acid | Ammonium | 1.0 | 8.5 | 5.5 |
| Example 3 | Adipic acid | Ammonium | 0.5 | 6.0 | 3.0 |
| Example 4 | Boric acid | Ammonium | 0.5 | 8.0 | 3.0 |
| Example 5 | Boric acid | Ammonium | 0.1 | 7.5 | 3.0 |
| Example 6 | Boric acid | Ammonium | 3.0 | 9.0 | 3.0 |
| Example 7 | Boric acid | Ammonium | 5.0 | 9.5 | 3.0 |
| Example 8 | Citric acid | Ammonium | 0.5 | 6.0 | 3.0 |
| Comparative Example 1 | Adipic acid | Ammonium | 1.0 | 5.0 | 5.5 |
| Comparative Example 2 | Phosphoric acid | Ammonium | 1.0 | 4.5 | 5.5 |

TABLE 2

| | Evaluation | | | |
|---|---|---|---|---|
| | Initial characteristics | | Reliability | |
| | ESR [mΩ] | Electrostatic capacity [μF] | ESR [mΩ] after voltage application at 145° C. for 1000 hours | Rate of change in electrostatic capacity after voltage application at 145° C. for 1000 hours |
| Example 1 | 8.5 | 556.2 | 11.1 | −15.7% |
| Example 2 | 9.0 | 565.9 | 12.0 | −15.5% |
| Example 3 | 9.6 | 522.3 | 13.9 | −18.3% |
| Example 4 | 8.0 | 532.0 | 10.8 | −18.0% |
| Example 5 | 7.5 | 527.2 | 10.5 | −18.1% |
| Example 6 | 9.1 | 541.7 | 12.4 | −16.3% |
| Example 7 | 10.1 | 536.8 | 13.8 | −17.5% |
| Example 8 | 9.8 | 539.0 | 12.5 | −17.1% |
| Comparative Example 1 | 12.3 | 483.6 | 23.7 | −34.2% |
| Comparative Example 2 | 13.9 | 498.1 | 26.3 | −32.4% |

The electrolytic capacitors according to Examples 1 to 8 were obtained by impregnating the wound body with the treatment solution containing the first acid component and the first base component, with the treatment solution having a higher pH than the pH of the polymer dispersion. Therefore, the electrolytic capacitors according to Examples 1 to 8 were capable of reducing the initial ESR, increasing the initial electrostatic capacity, and suppressing a change in the ESR and the electrostatic capacity after the measurement for reliability, compared to the electrolytic capacitors according to Comparative Examples 1 and 2 that were obtained by impregnating the wound body with the treatment solution having a lower pH than the pH of the polymer dispersion. This is considered to be because the electrolytic capacitors according to Examples 1 to 8 more easily allow the impregnation of the conductive polymer dispersion into the capacitor element and are thus capable of making the amount of the conductive polymer attached to the separator greater than the electrolytic capacitors according to Comparative Examples 1 and 2.

Further, the electrolytic capacitors according to Examples 1, 2, and 4 to 7 were obtained by impregnating the wound body with the treatment solution containing boric acid as the first acid component. Hence, the initial ESR can be reduced, the initial electrostatic capacity can be increased, and a change in the ESR and the electrostatic capacity after the measurement for reliability can be suppressed, compared to the electrolytic capacitors according to Comparative Examples 1 and 2 that were obtained by impregnating the wound body with the treatment solution containing no boric acid as the first acid component. This is considered to be because the electrolytic capacitors according to Examples 1, 2, and 4 to 7 more easily allow the impregnation of the conductive polymer dispersion into the capacitor element and are thus capable of making the amount of the conductive polymer attached to the separator greater than the electrolytic capacitors according to Comparative Examples 1 and 2.

CONCLUSION

A method for manufacturing electrolytic capacitor (1) according to a first aspect includes a first step, a second step, and a third step. In the first step, capacitor element (10) is formed. Capacitor element (10) includes anode body (21) including dielectric layer (210) formed on a surface of anode body (21), cathode body (22), and separator (23) disposed between anode body (21) and cathode body (22). In the second step, capacitor element (10) is impregnated with a treatment solution containing an acid component and a base component. In the third step, capacitor element (10) is, after the second step, impregnated with a conductive polymer dispersion in a state that a part of the treatment solution remains in capacitor element (10). The conductive polymer dispersion is obtained by dispersing, in a solvent, conductive polymer (250) particles each including polyanion. A pH of the treatment solution is higher than a pH of the conductive polymer dispersion.

This case facilitates the impregnation of the conductive polymer dispersion into capacitor element (10) due to the acid component and the base component in the treatment solution. The treatment solution having a higher pH than the pH of the conductive polymer dispersion also facilitates the impregnation of the conductive polymer dispersion into capacitor element (10). This enables an increase in amount of conductive polymer (250) attached to separator (23).

A method for manufacturing electrolytic capacitor (1) according to a second aspect includes a first step, a second step, and a third step. In the first step, capacitor element (10) is formed. Capacitor element (10) includes anode body (21) including dielectric layer (210) formed on a surface of anode body (21), cathode body (22), and separator (23) disposed between anode body (21) and cathode body (22). In the second step, capacitor element (10) is impregnated with a treatment solution containing a base component and boric acid as an acid component. In the third step, capacitor element (10) is, after the second step, impregnated with a conductive polymer dispersion in a state that a part of the treatment solution remains in capacitor element (10). The conductive polymer dispersion is obtained by dispersing, in a solvent, conductive polymer (250) particles each including polyanion.

This case facilitates the impregnation of the conductive polymer dispersion into capacitor element (10) due to the acid component and the base component in the treatment solution. The treatment solution containing boric acid as the acid component also facilitates the impregnation of the conductive polymer dispersion into capacitor element (10). This enables an increase in amount of conductive polymer (250) attached to separator (23).

In a method for manufacturing electrolytic capacitor (1) according to a third aspect, a pH of the treatment solution is more than or equal to 6 in the first or second aspect.

This case particularly facilitates the impregnation of separator (23) with the conductive polymer dispersion and particularly facilitates the impregnation of the conductive polymer dispersion into capacitor element (10).

In a method for manufacturing electrolytic capacitor (1) according to a fourth aspect, the pH of the conductive polymer dispersion is less than or equal to 5 in any one of the first to third aspects.

Even this case facilitates the impregnation of the conductive polymer dispersion into capacitor element (10).

In a method for manufacturing electrolytic capacitor (1) according to a fifth aspect, a temperature of the treatment solution is lower than or equal to 45° C. in any one of the first to fourth aspects.

In this case, it is possible to suppress evaporation of the base component contained in the treatment solution. Thereby, it is possible to suppress a change in pH of the treatment solution, allowing the base component to effectively introduce a proton. Particularly, when the base component is ammonium, the evaporation of ammonium is easily suppressed and thus the change in pH of the treatment solution is easily suppressed.

In a method for manufacturing electrolytic capacitor (1) according to a sixth aspect, the treatment solution is obtained by dissolving a boric acid compound and the boric acid compound is a hydrate in any one of the first to fifth aspects.

This case enables boric acid to reform a surface of separator (23). This case also allows boric acid to attach to the surface of separator (23). Thus, the impregnating ability of the conductive polymer dispersion into separator (23) is improved to facilitate the impregnation of capacitor element (10) with the conductive polymer dispersion.

In a method for manufacturing electrolytic capacitor (1) according to a seventh aspect, the boric acid compound is ammonium borate in the sixth aspect.

This case allows boric acid to improve the impregnating ability of the conductive polymer dispersion into separator (23) and to make viscosity of the conductive polymer dispersion less likely to rise. Further, this case facilitates the impregnation of the conductive polymer dispersion into capacitor element (10) and is less likely to cause a decrease in conductivity of the conductive polymer due to ammonium.

In a method for manufacturing electrolytic capacitor (1) according to an eighth aspect, a proportion of the boric acid compound in the treatment solution ranges from 0.1% by weight to 5.0% by weight, inclusive, in the sixth or seventh aspect.

This case enables effective improvement in the impregnating ability of the conductive polymer dispersion into separator (23).

In a method for manufacturing electrolytic capacitor (1) according to a ninth aspect, right before the third step, the boric acid is attached to a part of a surface of a fiber in separator (23) in any one of the sixth to eighth aspects.

In this case, boric acid is considered to absorb moisture in separator (23) to widen a space for enabling the impregnation with the conductive polymer dispersion in separator (23). Further, boric acid is re-dissolved in the conductive polymer dispersion to improve the impregnating ability of the conductive polymer dispersion. These phenomena result in facilitating the impregnation of the conductive polymer dispersion into capacitor element (10) to enable an increase in amount of the conductive polymer (250) attached to separator (23).

A method for manufacturing electrolytic capacitor (1) according to a tenth aspect includes, after the third step, a fourth step of impregnating capacitor element (10) with an electrolytic solution in any one of the first to eighth aspects.

This case enables the impregnation of electrolytic solution (26) into fine voids in solid electrolyte (25). This case also makes electrolytic solution (26) contact with dielectric layer (210) and solid electrolyte (25). The impregnation of capacitor element (10) with the treatment solution also facilitates the impregnation of electrolytic solution (26) into capacitor element (10).

In a method for manufacturing electrolytic capacitor (1) according to an eleventh includes, after the third step and before the fourth step, a step of volatilizing the base component in the tenth aspect.

In this case, it is possible to suppress a decrease in conductivity of the conductive polymer due to the base component.

In a method for manufacturing electrolytic capacitor (1) according to a twelfth aspect, separator (23) includes a cellulose fiber in any one of the first to eleventh aspects.

In this case, the cellulose fiber contains much moisture to allow boric acid to more easily exhibit an effect of improving the impregnating ability of the conductive polymer dispersion.

Electrolytic capacitor (1) according to a thirteenth aspect includes capacitor element (10) that includes anode body (21) including dielectric layer (210) formed on a surface of anode body (21), cathode body (22), and separator (23) disposed between anode body (21) and cathode body (22). Capacitor element (10) includes conductive polymer (250)

particles each including polyanion. And boric acid is present on a surface of separator (23).

This case enables boric acid to improve impregnating ability of a conductive polymer dispersion into separator (23) and enables an increase in amount of conductive polymer (250) attached to separator (23). This case also enables improvement in impregnating ability of electrolytic solution (26) into capacitor element (10).

In electrolytic capacitor (1) according to a fourteenth aspect, separator (23) includes a cellulose fiber in the thirteenth aspect.

This case allows boric acid to more easily exhibit an effect of improving the impregnating ability of the conductive polymer dispersion.

In electrolytic capacitor (1) according to a fifteenth aspect, the electrolytic capacitor further includes an electrolytic solution. Capacitor element (10) is impregnated with the electrolytic solution in the thirteenth or fourteenth aspect.

This case enables the impregnation of electrolytic solution (26) into fine voids in solid electrolyte (25). This case also makes electrolytic solution (26) contact with dielectric layer (210) and solid electrolyte (25).

What is claimed is:

1. A method for manufacturing an electrolytic capacitor, the method comprising:
    a first step of forming a capacitor element including an anode body, a cathode body, and a separator, the anode body including a dielectric layer formed on a surface of the anode body, the separator being disposed between the anode body and the cathode body;
    a second step of impregnating the capacitor element with a treatment solution containing an acid component and a base component; and
    a third step of impregnating, after the second step, the capacitor element with a conductive polymer dispersion in a state that a part of the treatment solution remains in the capacitor element, the conductive polymer dispersion being obtained by dispersing, in a solvent, conductive polymer particles each including polyanion,
    a pH of the treatment solution is higher than a pH of the conductive polymer dispersion.

2. The method for manufacturing an electrolytic capacitor according to claim 1, wherein the pH of the treatment solution is more than or equal to 6.

3. The method for manufacturing an electrolytic capacitor according to claim 1, wherein the pH of the conductive polymer dispersion is less than or equal to 5.

4. The method for manufacturing an electrolytic capacitor according to claim 1, wherein a temperature of the treatment solution is lower than or equal to 45° C.

5. The method for manufacturing an electrolytic capacitor according to claim 1, wherein the treatment solution is obtained by dissolving a boric acid compound, the boric acid compound being a hydrate.

6. The method for manufacturing an electrolytic capacitor according to claim 5, the boric acid compound is ammonium borate.

7. The method for manufacturing an electrolytic capacitor according to claim 5, wherein a proportion of the boric acid compound in the treatment solution ranges from 0.1% by weight to 5.0% by weight, inclusive.

8. The method for manufacturing an electrolytic capacitor according to claim 5, wherein, right before the third step, boric acid is attached to a part of a surface of a fiber in the separator.

9. The method for manufacturing an electrolytic capacitor according to claim 1, the method further comprising, after the third step, a fourth step of impregnating the capacitor element with an electrolytic solution.

10. The method for manufacturing an electrolytic capacitor according to claim 9, the method comprising, after the third step and before the fourth step, a step of volatilizing the base component.

11. The method for manufacturing an electrolytic capacitor according to claim 1, wherein the separator includes a cellulose fiber.

12. A method for manufacturing an electrolytic capacitor, the method comprising:
    a first step of forming a capacitor element including an anode body, a cathode body, and a separator, the anode body including a dielectric layer formed on a surface of the anode body, the separator being disposed between the anode body and the cathode body;
    a second step of impregnating the capacitor element with a treatment solution containing a base component and boric acid as an acid component; and
    a third step of impregnating, after the second step, the capacitor element with a conductive polymer dispersion obtained by dispersing, in a solvent, conductive polymer particles each including polyanion.

13. The method for manufacturing an electrolytic capacitor according to claim 12, wherein the pH of the treatment solution is more than or equal to 6.

14. The method for manufacturing an electrolytic capacitor according to claim 12, wherein the pH of the conductive polymer dispersion is less than or equal to 5.

15. The method for manufacturing an electrolytic capacitor according to claim 12, wherein a temperature of the treatment solution is lower than or equal to 45° C.

16. The method for manufacturing an electrolytic capacitor according to claim 12, wherein the treatment solution is obtained by dissolving a boric acid compound, the boric acid compound being a hydrate.

17. The method for manufacturing an electrolytic capacitor according to claim 16, the boric acid compound is ammonium borate.

18. The method for manufacturing an electrolytic capacitor according to claim 16, wherein a proportion of the boric acid compound in the treatment solution ranges from 0.1% by weight to 5.0% by weight, inclusive.

19. The method for manufacturing an electrolytic capacitor according to claim 16, wherein, right before the third step, boric acid is attached to a part of a surface of a fiber in the separator.

20. The method for manufacturing an electrolytic capacitor according to claim 12, the method further comprising, after the third step, a fourth step of impregnating the capacitor element with an electrolytic solution.

21. The method for manufacturing an electrolytic capacitor according to claim 20, the method comprising, after the third step and before the fourth step, a step of volatilizing the base component.

22. The method for manufacturing an electrolytic capacitor according to claim 12, wherein the separator includes a cellulose fiber.

23. An electrolytic capacitor comprising a capacitor element including an anode body, a cathode body, and a separator, the anode body including a dielectric layer formed on a surface of the anode body, the separator being disposed between the anode body and the cathode body, wherein:
    the capacitor element includes conductive polymer particles each including polyanion, and
    boric acid is present on a surface of the separator.

24. The electrolytic capacitor according to claim 23, wherein the separator includes a cellulose fiber.

25. The electrolytic capacitor according to claim 23 further comprising an electrolytic solution, wherein the capacitor element is impregnated with the electrolytic solution.

\* \* \* \* \*